US009422429B2

(12) United States Patent
Hoffmann et al.

(10) Patent No.: US 9,422,429 B2
(45) Date of Patent: Aug. 23, 2016

(54) TRANSPARENT POLYAMIDE-IMIDES

(71) Applicant: EMS-PATENT AG, Domat/Ems (CH)

(72) Inventors: Botho Hoffmann, Domat/Ems (CH);
Luc Scherrer, Tamins (CH); Heinz
Hoff, Tamins (CH)

(73) Assignee: EMS-PATENT AG, Domat/Ems (CH)

( * ) Notice: Subject to any disclaimer, the term of this
patent is extended or adjusted under 35
U.S.C. 154(b) by 0 days.

(21) Appl. No.: 13/875,921

(22) Filed: May 2, 2013

(65) Prior Publication Data
US 2014/0072745 A1 Mar. 13, 2014

(30) Foreign Application Priority Data

Sep. 12, 2012 (EP) .................... 12183987

(51) Int. Cl.
C08L 79/08 (2006.01)
C08G 73/14 (2006.01)
C08L 77/00 (2006.01)
C08G 69/00 (2006.01)
C08K 3/34 (2006.01)
C08K 3/26 (2006.01)
C08K 3/22 (2006.01)
C08K 3/30 (2006.01)
C08K 3/08 (2006.01)
C08K 3/40 (2006.01)
C08G 73/10 (2006.01)

(52) U.S. Cl.
CPC .............. C08L 77/00 (2013.01); C08G 69/00
(2013.01); C08G 73/1075 (2013.01); C08G
73/14 (2013.01); C08K 3/08 (2013.01); C08K
3/22 (2013.01); C08K 3/26 (2013.01); C08K
3/30 (2013.01); C08K 3/34 (2013.01); C08K
3/346 (2013.01); C08K 3/40 (2013.01); C08L
79/08 (2013.01); Y10T 428/139 (2015.01)

(58) Field of Classification Search
CPC ............................ C08L 79/08; C08G 73/14
USPC ........................................... 528/324
See application file for complete search history.

(56) References Cited

U.S. PATENT DOCUMENTS 3,428,486 A * 2/1969 George ............... 428/383
3,494,890 A * 2/1970 Morello .............. 528/179
3,518,230 A * 6/1970 Sheffer et al. ........... 528/73
3,658,773 A * 4/1972 Zecher et al. ............ 528/48
3,714,131 A * 1/1973 Hoback et al. .......... 528/342
3,726,712 A * 4/1973 Rieck et al. ............. 428/383
3,753,998 A * 8/1973 Morello ............... 524/726
3,778,411 A * 12/1973 Emerick et al. ......... 528/229
3,794,625 A * 2/1974 Anderson et al. ........ 528/324

(Continued)

FOREIGN PATENT DOCUMENTS

DE 1 770 416 U 7/1958
DE 1795752 A1 8/1974

(Continued)

OTHER PUBLICATIONS

Machine translation of JP 2002161136 A, 2014.*
G. Kruse, et al., "Nomenklatur de Organischen Chemie", International Union of Pure and Applied Chemistry (IUPAC), VCH, Weinheim, 1997, pp. 160-161.
Database WPI Week 197829, Thomson Scientific, "Alcohol Soluble Polyamideimide Production—by Mixing Alkylene Di-amine, Alkylene Di-basic acid . . . , Thomson Scientific, 1978" XP-002688623.

(Continued)

Primary Examiner — Liam J Heincer
(74) Attorney, Agent, or Firm — Sughrue Mion, PLLC

(57) ABSTRACT

What is described is a transparent polyamide-imide based on one or more different imido-dicarboxylic acids (AB) or derivatives thereof, and cycloaliphatic diamines (C) comprising 6 to 24 carbon atoms, wherein the imido-dicarboxylic acids (AB) or derivatives thereof are selected from the group of imido-dicarboxylic acids (AB) having the following structural formulas:

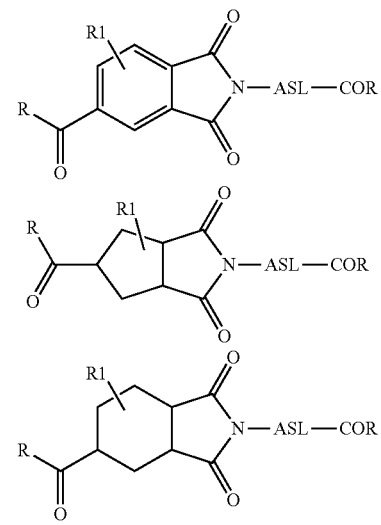

wherein:
ASL=$(CH_2)_{5-11}$, phenylene, (ylomethyl)phenyl, bis(ylomethyl)benzene, cyclohexanediyl, (ylomethyl)cyclohexyl, bis(ylomethyl)cyclohexane, cyclopentanediyl, (ylomethyl)cyclopentyl, bis(ylomethyl)cyclopentane,
R=OH, O-alkyl, O-aryl, Cl, NH-ASL-COOH, Br, O—(CO)-alkyl, O—(CO)-aryl,
R1=H, methyl, ethyl, propyl, with the provision that the ring can be substituted once or twice, and, with double substitution of the ring, the two substituents can be selected from the group, but may be different,
and also moulding compounds based thereon, a method for production, and uses.

28 Claims, No Drawings

(56) References Cited

U.S. PATENT DOCUMENTS

| | | | | |
|---|---|---|---|---|
| 3,922,252 A | * | 11/1975 | Holub et al. | 525/424 |
| 4,069,209 A | * | 1/1978 | Lange | 528/289 |
| 4,113,706 A | * | 9/1978 | Lange | 528/289 |
| 4,161,477 A | * | 7/1979 | Long et al. | 548/461 |
| 4,259,221 A | * | 3/1981 | Pauze | 524/600 |
| 4,268,661 A | * | 5/1981 | Schmid et al. | 528/338 |
| 4,461,786 A | * | 7/1984 | Pauze | 427/120 |
| 4,478,913 A | * | 10/1984 | Pauze | 428/383 |
| 4,549,006 A | * | 10/1985 | Zecher et al. | 528/73 |
| 4,624,981 A | * | 11/1986 | Zecher et al. | 524/326 |
| 4,628,079 A | * | 12/1986 | Zecher et al. | 528/49 |
| 4,640,970 A | * | 2/1987 | Zecher et al. | 528/73 |
| 4,792,590 A | * | 12/1988 | Zecher et al. | 525/424 |
| 5,004,795 A | * | 4/1991 | Zecher et al. | 528/73 |
| 5,068,307 A | * | 11/1991 | Hara et al. | 528/125 |
| 5,093,457 A | * | 3/1992 | Zecher et al. | 528/73 |
| 5,214,088 A | * | 5/1993 | Allen et al. | 524/413 |
| 5,322,922 A | * | 6/1994 | Berger et al. | 528/337 |
| 5,403,666 A | * | 4/1995 | Lubowitz et al. | 428/474.4 |
| 5,480,616 A | * | 1/1996 | Richardson et al. | 422/134 |
| 5,512,676 A | * | 4/1996 | Sheppard et al. | 544/198 |
| 5,521,276 A | * | 5/1996 | Choi et al. | 528/322 |
| 5,587,452 A | * | 12/1996 | Koning et al. | 528/350 |
| 5,703,177 A | * | 12/1997 | Hoff | 525/411 |
| 5,880,252 A | * | 3/1999 | Kim et al. | 528/332 |
| 8,222,365 B2 | * | 7/2012 | Shimeno et al. | 528/60 |
| 2004/0247907 A1 | * | 12/2004 | Goda et al. | 428/473.5 |
| 2005/0171326 A1 | * | 8/2005 | Edwards et al. | 528/272 |
| 2007/0123716 A1 | * | 5/2007 | Okoshi | 549/245 |
| 2008/0160304 A1 | * | 7/2008 | Xu | 428/375 |
| 2010/0018756 A1 | * | 1/2010 | Shimeno et al. | 174/254 |
| 2011/0160407 A1 | * | 6/2011 | Touraud et al. | 525/435 |
| 2012/0286620 A1 | * | 11/2012 | Murray et al. | 310/215 |
| 2013/0309489 A1 | * | 11/2013 | Murakami et al. | 428/355 CN |

FOREIGN PATENT DOCUMENTS

| | | | |
|---|---|---|---|
| EP | 0 136 526 A2 | 4/1985 | |
| EP | 0 136 528 A2 | 4/1985 | |
| EP | 0 173 211 A2 | 3/1986 | |
| EP | 0 291 699 A2 | 11/1988 | |
| EP | 0 470 464 A2 | 2/1992 | |
| FR | 1.427.087 A | 2/1966 | |
| GB | 1 397 125 A | 6/1975 | |
| JP | 53-019639 B | 6/1978 | |
| JP | 2002161136 A | * 6/2002 | C08G 73/10 |

OTHER PUBLICATIONS

European Search Report dated Jun. 11, 2013, issued in European Patent Application No. 13164834.7.
English Translation of European Search Report dated Jun. 11, 2013, issued in European Patent Application No. 13164834.7.
Andrea Staubli, et al., "Characterization of Hydrolytically Degradable Amino Acid Containing Poly(anhydride-co-imides)", Macromolecules, 1991, pp. 2283-2290, No. 24, Department of Chemical Engineering, Massachusetts Institute of Technology, Cambridge, Massachusetts.
European Search Report for Patent Application No. 12183987.2-2115 dated Dec. 14, 2012.

* cited by examiner

TRANSPARENT POLYAMIDE-IMIDES

TECHNICAL FIELD

The present invention relates to transparent polyamide-imides and blends or alloys thereof with other polymers, in particular polyamides, and also to moulded parts that can be produced or are produced therefrom, which, inter alia, demonstrate high toughness and good solvent resistance with simultaneously high rigidity and heat deflection temperature.

PRIOR ART

FR 1427087 describes dicarboxylic acids based on pyromellitic acid anhydride and amino acids or lactams, and also describes polycondensates produced therefrom. The production of these bisimide dicarboxylic acids and the polycondensation with diamines or diols is always carried out in solution. The production of various polyester-imides and polyamide-imides is described in a series of examples. Inter alia, the reaction of the bisimide dicarboxylic acid based on pyromellitic acid anhydride and caprolactam with hexanediol to form a polyester or with hexamethylenediamine to form a polyamide-imide is mentioned. Besides the solubility and melting point, merely the decomposition temperature is also specified. Pyromellitic acid or derivatives thereof lead in particular in the melt to cross-linking and therefore to moulding compounds that can no longer be processed thermoplastically, which is why they are only used in the examples in diluted solution. In order to increase the reactivity under these conditions, the acid chloride of the bisimide dicarboxylic acid based on pyromellitic acid is used. Since, due to their structure, the pyromellitic acid derivatives always form two imide bonds, two mol of lactam always react per mol of pyromellitic acid derivative, whereby the glass transition temperature is considerably reduced by the high proportions of aliphatic structural units.

The method for producing polyimides according to U.S. Pat. No. 4,161,477 also uses low-molecular bisimides from pyromellitic acid or benzophenone tetracarboxylic acid and caprolactam as a starting material in the polycondensation with aromatic diamines, such as diaminodiphenyl ether. In a polyimide exchange reaction at temperatures above 300° C., the polyamide-imides formed intermediately converts into the polyimides, wherein caprolactam is again cleaved.

US 2011/0160407 A1 discloses a production method for semi-aromatic polyamide-imides (PAIs) based on a trifunctional or tetrafunctional carboxylic acid, preferably aromatic in nature, in the melt, wherein the method is practically identical to PA66 production. Differently composed copolymers from the monomers hexanediamine, adipic acid, terephthalic acid and trimellitic acid (TMA) or pyromellitic acid are used in the examples. These copolymers are not transparent and do not contain lactams or amino carboxylic acids. In addition, mixtures of PA66 and the polyamide-imide 6TMA are disclosed. Due to the relatively high glass transition temperature of the PAI, the modulus of elasticity measured at 90° C. rises with increasing PAI concentration of the blend.

A method for producing phthalimido-N-carboxylic acids by reacting substituted phthalic acid anhydrides and lactams is presented in DE1770416. The reaction is performed without difficulty when electron-attracting substituents are bonded to the phthalic acid anhydrides. Preferred anhydrides are trimellitic acid anhydride (TMA) and pyromellitic acid anhydride, and preferred lactams are caprolactam and laurolactam. The reaction takes place at temperatures in the range of 130-250° C. in solution or in substance. The imido-dicarboxylic acid consisting of TMA and caprolactam is produced for example in the melt at 200° C. and has a melting point in the range of 207-210° C. The reaction of the bifunctional imido-carboxylic acids with monofunctional alcohols is mentioned as a possible secondary reaction.

Transparent polyether ester amide imides and use thereof for the production of medical articles of use is described in EP 0 470 464 A2. The objective is to develop transparent polymers that have the elastomeric behaviour of polyurethanes, but have increased thermal stability. These polymers are produced by polycondensation of bisimido-dicarboxylic acids, obtainable by reacting 2 mol of TMA with 1 mol of an aliphatic or cycloaliphatic diamine, and polyether diols, such as polytetrahydrofuran, and butanediol in the presence of an esterification catalyst.

In Macromolecules 1991 (24) 2283-2290, Staubli et. al. present poly(anhydride-co-imides) that can be broken down completely by hydrolysis. Again, imido-dicarboxylic acids based on TMA and amino carboxylic acids, which are converted before further reaction with longer-chain dicarboxylic acid acetanhydrides into the mixed anhydrides of acetic acid, form the starting point for the synthesis of these copolymers. The copolymers have relatively low mechanical strengths and low glass transition temperatures.

DISCLOSURE OF THE INVENTION

The object of the invention is therefore, inter alia, to provide new transparent polyamide-imides (PAIs) and moulding compounds based thereon, which, inter alia, are improved compared to the prior art in terms of the mechanical properties, even in wet or moist conditions, and also with respect to the heat deflection temperature. In addition, the moulding compounds or moulded parts produced therefrom should demonstrate high toughness and good solvent resistance with simultaneously high rigidity and heat deflection temperature. Furthermore, moulded parts based on polyamide-imides or moulding compounds produced therefrom and also methods for producing the polyamide-imides and moulding compounds of this type are to be provided.

The invention therefore relates to transparent polyamide-imides (PAIs) produced on the basis of at least the following monomers:
(A) cycloaliphatic or aromatic tricarboxylic acids, in particular comprising at least two vicinal carboxyl groups, that it to say ortho-carboxyl groups or 1,2-carboxyl groups, or derivatives thereof, such as acid chloride, ester or anhydride;
(B) amino carboxylic acids or lactams, in particular or specifically those comprising 6-12 C atoms;
(C) cycloaliphatic diamines, in particular or specifically those comprising 6 to 24 C atoms.

The proposed polyamide-imides may therefore also comprise further structural units, for example as are specified below in the components (D), (E) or (F).

Specifically, the invention relates to transparent polyamide-imides (PAIs) according to claim 1, specifically transparent polyamide-imides based on one or more (then different) imido-dicarboxylic acids or derivatives thereof (components (A) and (B), referred to hereinafter inter alia as dicarboxylic acid component AB) and cycloaliphatic diamines (C) comprising 6 to 24 carbon atoms, wherein the imido-dicarboxylic acids or derivatives are selected from the group of imido-dicarboxylic acids having the following structural formulas:

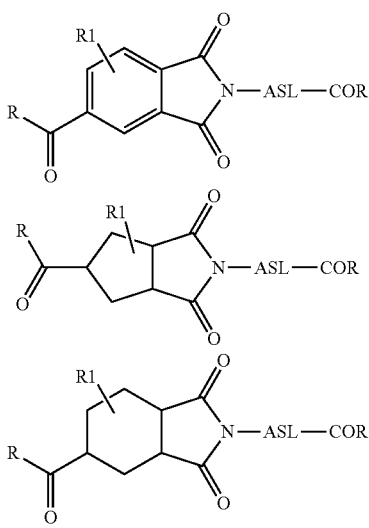

wherein the following definitions apply:
ASL=$(CH_2)_{5-11}$, phenylene, (ylomethyl)phenyl, bis(ylomethyl)benzene, cyclohexanediyl, (ylomethyl)cyclohexyl, bis(ylomethyl)cyclohexane, cyclopentanediyl, (ylomethyl)cyclopentyl, bis(ylomethyl)cyclopentane,
R=OH, O-alkyl, O-aryl, Cl, NH-ASL-COOH, Br, O—(CO)-alkyl, O—(CO)-aryl
R1=H, methyl, ethyl, propyl, with the provision that the ring can be substituted once or twice, and, with double substitution of the ring, the two substituents are selected from the group and can be the same or different,
this preferably with the proviso that the transparent polyamide-imide is essentially or completely free from building blocks in which said cycloaliphatic diamines (C) are, with at least one amino-group thereof, forming the imido-element of imido-aminocarboxylic acids corresponding to said imido-dicarboxylic acids (AB) and in which said cycloaliphatic diamines (C) are replacing the structural element N-ASL-COR therein,
and/or further preferably with the proviso that the transparent polyamide-imide is free from aromatic diamines. Pursuant to the invention as described and claimed here aromatic diamines means diamines having at least one amino group connected directly to the aromatic structure element of the molecule. In this context diamines such as MXD or PXD are not aromatic diamines, because in these cases the amino groups are bonded to the aliphatic methylene group and not directly to the aromatic benzene ring.

According to IUPAC nomenclature "Ylo" refers to a radical as part of a substituent if it is designated as prefix and indicates the elimination of a hydrogen atom (see e.g. G. Kruse, Nomenklatur der Organischen Chemie, VCH, Weinheim, 1997, p. 161).

According to a first preferred embodiment, the polyamide-imide is based on the one hand exclusively on a diacid part, which is based exclusively on: 20-100 mol-% of one or more of said imido-dicarboxylic acids (AB) or derivatives thereof, 0-80 mol-% of at least one further diacid (D), different from said imido-dicarboxylic acids (AB) which are preferably not (the above-mentioned) imido-aminocarboxylic acids, wherein the diacid part supplements to 100 mol-% diacid, and on the other hand on a diamine part based exclusively on: 20-100 mol-% of at least one of said cycloaliphatic diamines (C) comprising 6 to 24 carbon atoms, 0-80 mol-% of at least one further, preferably non-aromatic diamine (E), different from said cycloaliphatic diamines (C), wherein the diamine part supplements to 100 mol-% diamine.

According to a further preferred embodiment, the transparent polyamide-imide is exclusively based on one or more of said imido-dicarboxylic acids (AB) or derivatives thereof, and said cycloaliphatic diamines (C) comprising 6 to 24 carbon atoms.

The group R, which in the above structural formulas appears once to the left on the ring at the C=O substituents and once in the structural formulas to the right at the chain— ASL-COR, can either be selected identically at these two positions or can be different. This is generally true in conjunction with the above structural formulas, but also in conjunction with the further preferred embodiments specified below, in which the group R is named.

The imido-dicarboxylic acid or derivative thereof is thus formed from the above-mentioned component (A), that is to say from a cycloaliphatic or aromatic tricarboxylic acid, preferably such as trimellitic acid or derivatives thereof (first structure), in particular from trimellitic acid anhydride and also amino acids or lactams comprising 6 to 12 carbon atoms (component (B)).

At least one imido-dicarboxylic acid or derivative, preferably the entire proportion of imido-dicarboxylic acid or derivative in the polyamide-imide, preferably corresponds to the following structural formula:

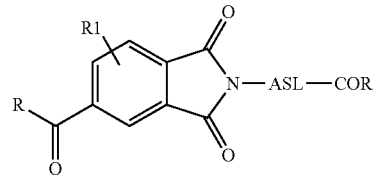

wherein, preferably, R1=H, and/or ASL=$(CH_2)_{5-11}$, and/or R=OH, NH-ASL-COOH.

The following cycloaliphatic or aromatic tricarboxylic acids or derivatives thereof, such as acid chlorides, esters or anhydrides, are preferably used as component (A): cyclopentane-1,2,4-tricarboxylic acid, 2-methyl-cyclopentane-1,2,4-tricarboxylic acid, 3-methyl-cyclopentane-1,2,4-tricarboxylic acid, 3,5-dimethyl-cyclopentane-1,2,4-tricarboxylic acid, cyclohexane-1,2,4-tricarboxylic acid, 2-methyl-cyclohexane-1,2,4-tricarboxylic acid, 3-methyl-cyclohexane-1,2,4-tricarboxylic acid, 4-methyl-cyclohexane-1,2,4-tricarboxylic acid, 5-methyl-cyclohexane-1,2,4-tricarboxylic acid, 1,2-dimethyl-cyclohexane-1,2,4-tricarboxylic acid, 3,5-dimethyl-cyclohexane-1,2,4-tricarboxylic acid, 2,4-dimethyl-cyclohexane-1,2,4-tricarboxylic acid, or mixtures thereof.

Trimellitic acid anhydride (TMA) or trimellitic acid (TMS) or derivatives of trimellitic acid, such as chlorides, esters or mixed anhydrides, are particularly preferably used as component (A).

As component (B), α,ω-amino acids or lactams, in particular comprising 6 to 12 carbon atoms, are used, wherein amino acids or lactams selected from the group consisting of: m-aminobenzoic acid, p-aminobenzoic acid, p-(aminomethyl)benzoic acid, m-(aminomethyl)benzoic acid, aminophenylacetic acid, (aminomethyl)phenylacetic acid, 3- or 4-aminocyclohexanecarboxylic acid, 3- or 4-(aminomethyl) cyclohexanecarboxylic acid, 3- or 4-aminocyclohexaneacetic acid, 3- or 4-(aminomethyl)cyclohexaneacetic acid, 3-aminocyclopentanecarboxylic acid, 3-(amino-methyl)cyclopentanecarboxylic acid, 3-aminocyclopentaneacetic acid, 3-(aminomethyl)-cyclopentaneacetic acid, caprolactam (CL), ω-aminocaproic acid, ω-aminoheptanoic acid, ω-aminooctanoic acid, ω-aminononanoic acid, ω-aminodecanoic acid, ω-amino undecanoic acid (AUA), laurolactam (LL) and ω-aminododecanoic acid (ADA), or mixtures thereof, are preferred. Here, caprolactam, ω-aminocaproic acid, laurolactam, ω-aminododecanoic acid and ω-aminoundecanoic acid are particularly preferred.

Imido-dicarboxylic acid, (unsubstituted) trimellitic imido-caproic acid, (unsubstituted) trimellitic imido-undecanoic acid or (unsubstituted) trimellitic imido-lauric acid or a mixture thereof is particularly preferred as component AB.

The invention furthermore relates to a method for producing a polyamide-imide, in particular a polyamide-imide as outlined above. The method is preferably characterised in that, in a first reaction step, an imido-dicarboxylic acids (AB) selected from the group of imido-dicarboxylic acids having the following structural formulas:

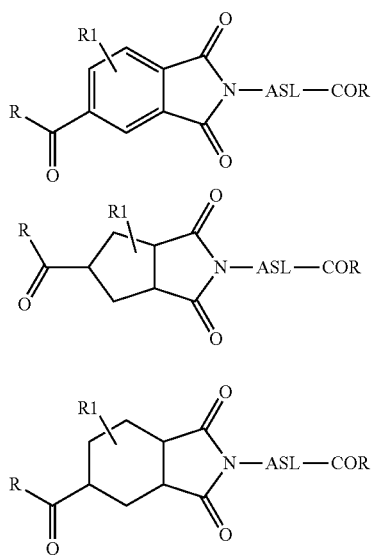

wherein the following definitions apply:
ASL=$(CH_2)_{5-11}$, phenylene, (ylomethyl)phenyl, bis(ylomethyl)benzene, cyclohexanediyl, (ylomethyl)cyclohexyl, bis(ylomethyl)cyclohexane, cyclopentanediyl, (ylomethyl)cyclopentyl, bis(ylomethyl)cyclopentane,
R=OH, O-alkyl, O-aryl, Cl, NH-ASL-COOH, Br, O—(CO)-alkyl, O—(CO)-aryl
R1=H, methyl, ethyl, propyl, with the provision that the ring can be substituted once or twice, and, with double substitution of the ring, the two substituents are selected from the group and can be the same or different, is formed starting from the corresponding cycloaliphatic or aromatic tricarboxylic acids having at least two vicinal carboxyl groups (A) or derivatives thereof and amino carboxylic acid or lactam (B), and, in a second subsequent and separate step, these imido-dicarboxylic acids (AB) or derivatives thereof are reacted with cycloaliphatic diamines (C) comprising 6 to 24 carbon atoms, and optionally further diacids (D), different from the component (AB), and/or further, preferably non-aromatic, diamines (E), different from the component (C), to form the polyamide-imide.

When preparing the imido-dicarboxylic acid or derivatives thereof, a dicarboxylic acid component is preferably formed in a first method step from the monomers A and B, which are then polycondensated with cycloaliphatic diamines and optionally additionally with further diamines, dicarboxylic acids and lactams to form high-molecular polyamide-imides. The dicarboxylic acid component consisting of the monomers A and B is formed by imido-dicarboxylic acids or derivatives thereof, which will be referred to hereinafter inter alia as the dicarboxylic acid component AB. Schema 1 shows the reaction of the cyclical tricarboxylic acid equivalent trimellitic acid anhydride, which is preferably used, with the preferred C6-C12 lactams to form the corresponding imido-carboxylic acids.

SCHEMA 1

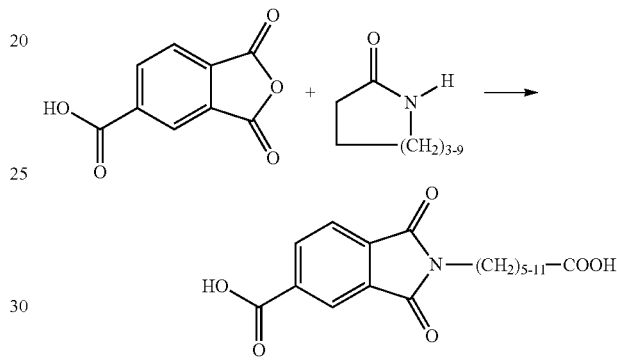

To this end, the components (A) and (B) are preferably used in a molar ratio in the range from 1:2.5 to 1:1. A molar ratio (A):(B) from 1:2 to 1:1 is preferably used, particularly preferably a molar ratio of 1:1 or practically 1:1. This means that the monomers (A) and (B) are particularly preferably used in a practically equimolar ratio to one another. In particular the component (AB) does not include any free or unreacted cycloaliphatic or aromatic tricarboxylic acid (A) or derivatives thereof. Furthermore it is preferred that component (AB) includes less than 10 wt-%, particularly preferred less than 5 wt-% unreacted lactams or aminocarboxylic acids (B). The exclusion of free or unreacted component (A) form the condensation reaction avoids the formation of an imid structure (AC) and in particular the formation of a bis-imid structure (ACA) by the reaction of cycloaliphatic or aromatic tricarboxylic acid (A) or derivatives thereof and the cycloaliphatic diamine (C).

In the second step of the preferred production method, the dicarboxylic acid component AB thus produced is reacted with at least one cycloaliphatic diamine, preferably a cycloaliphatic diamine comprising 6 to 24 carbon atoms and particularly preferably with a cycloaliphatic diamine comprising 12 to 18 carbon atoms to form polyamide-imide. This synthesis step is illustrated by way of example in Schema 2, again for the situation in which the imido-dicarboxylic acid based on trimellitic acid anhydride has been obtained with the preferred C6-C12 lactams, although the Schema can also be applied analogously to other starting systems comprised by claim 1, as can Schema 1 above and the further Schemata below.

SCHEMA 2

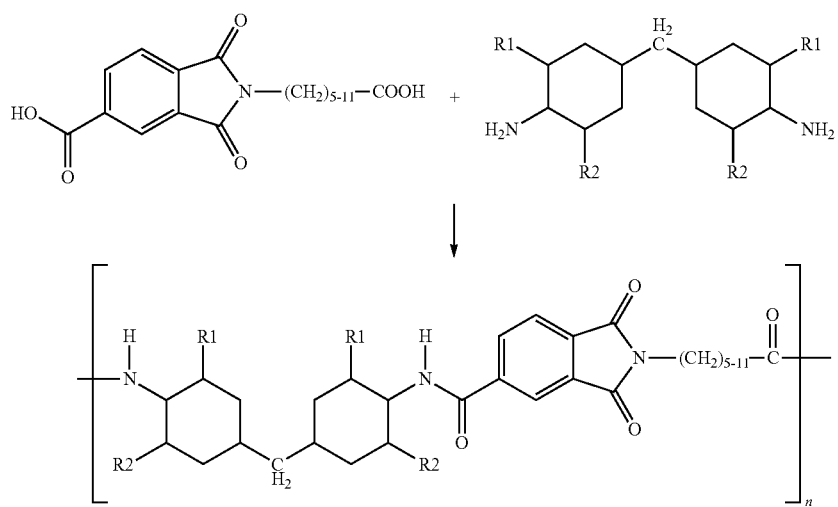

Polyamide-imides based on cycloaliphatic diamines are preferably used as component (C) and are selected from the following group: bis-(4-amino-3-methyl-cyclohexyl)-methane (MACM), bis-(4-amino-cyclohexyl)-methane (PACM), bis-(4-amino-3-ethyl-cyclohexyl)-methane (EACM), bis-(4-amino-3,5-dimethyl-cyclohexyl)-methane (TMDC), 2,6-norbornanediamine or 2,6-bis-(aminomethyl)-norbornane or 1,3-cyclohexyldiamine, 1,4-cyclohexyldiamine, bis-(1,3-aminomethyl)cyclohexane, isophoronediamine, cyclohexanediamine, 1,3-bis-(aminomethyl)cyclohexane, 1,4-bis-(aminomethyl)cyclohexane, isophoronediamine, norbornanedimethylamine, 2,2-(4,4'-diaminodicyclohexyl)propane (PACP) and mixtures thereof. In particular, alkyl-substituted bis-(aminocyclohexyl)methane or bis-(aminocyclohexyl)propane is preferred. Linear and/or branched C1-C6, preferably C1-C4 alkyl groups are preferred as alkyl substituents, therefore in particular methyl groups, ethyl groups, propyl groups, isopropyl groups or butyl groups, with methyl groups being particularly preferred. Bis-(4-amino-3-methyl-cyclohexyl)-methane (MACM) is used as alkyl-substituted bis-(aminocyclohexyl)methane in a particularly preferred embodiment. In accordance with the invention, mixtures of 2 or 3 different cycloaliphatic diamines can also be used.

In a further preferred embodiment, the present invention also includes copolymers, which, in addition to the imide-amide system CAB, contain at least one further amide system, that is to say at least one further diacid (D) different from the component AB, for example in the form of a system CD, wherein component (D) is an aliphatic, cycloaliphatic or aromatic dicarboxylic acid. Such a preferred copolyamide-imide based on an amide-imide system consisting of trimellitic acid anhydride, laurolactam and MACM and also an additional amide system consisting of MACM and isophthalic acid (as component D) is illustrated by way of example in Schema 3. Here, the indices n and m have values between 20 and 80 mol % and together form 100 mol %.

SCHEMA 3

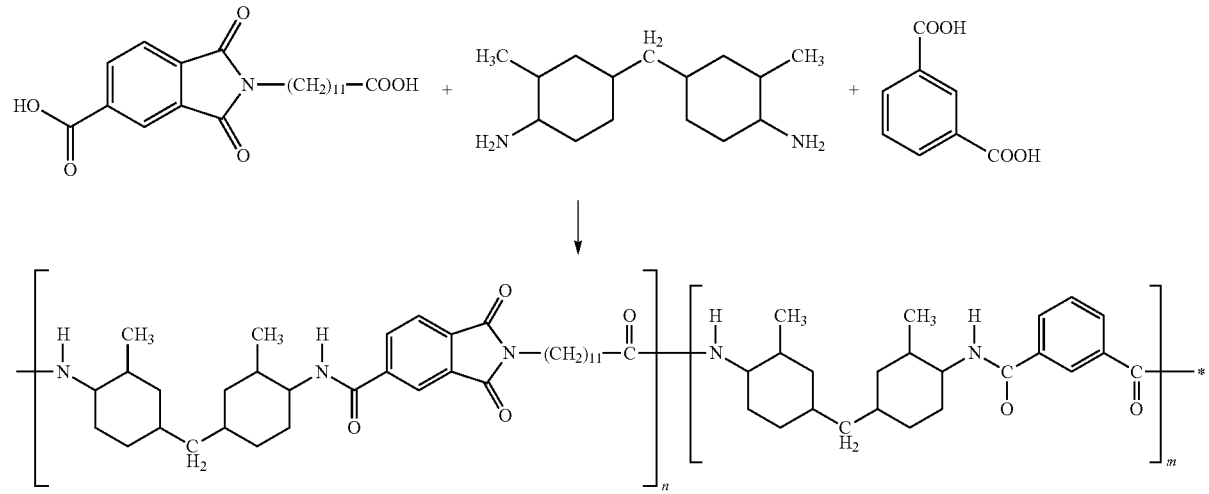

Copolyamide-imides of this type based on dicarboxylic acid component AB, cycloaliphatic diamines (C) and also a further dicarboxylic acid (component D) are preferably composed in an amount of 80 to 20 mol %, in particular in an amount of 70 to 30 mol %, from the polyamide-imide unit CAB and in an amount of 20 to 80 mol %, in particular in an amount of 30-70 mol %, from the polyamide unit CD. In other words, the dicarboxylic acid component AB in such copolyamide-imides is replaced in an amount of up to 80 mol % by another dicarboxylic acid, wherein the sum of all dicarboxylic acids together gives 100 mol %.

Bifunctional, aliphatic, cycloaliphatic or aromatic carboxylic acids (dicarboxylic acids), preferably comprising 2 to 36 carbon atoms, particularly preferably comprising 6-18 carbon atoms, are preferably used as a further diacid, that is to say as component D. Dicarboxylic acids of component D, which are used in combination with the obligatory imidodicarboxylic acids (dicarboxylic acid component AB), are, inter alia, adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, isophthalic acid, terephthalic acid, naphthalene dicarboxylic acid, cis- and/or trans-cyclohexane-1,4-dicarboxylic acid and/or cis- and/or trans-cyolohexane-1,3-dicarboxylic acid (CHDA), and mixtures thereof.

A further embodiment includes copolymers, which, besides the imide-amide system CAB, contain at least one further amide-imide system EAB, that it is to say are formed on the basis of a further diamine, different from the component (C), as component (E), wherein component (E) is preferably an linear or branched aliphatic diamine. Such a preferred copolyamide-imide with the additional amide-imide system consisting of hexamethylenediamine (component E) and the dicarboxylic acid component AB, formed from trimellitic acid anhydride and laurolactam, is illustrated by way of example in Schema 4.

amount of 20 to 80 mol %, in particular in an amount of 30 to 70 mol %, from the polyamide unit EAB.

Component E is preferably an linear or branched aliphatic diamine, preferably comprising 4 to 18 carbon atoms, particularly preferably comprising 6 to 14 carbon atoms. Diamines of component E, which are always used in combination with the obligatory diamines of component C, are, inter alia, 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, 1-15-pentadecanediamine, 1,16-hexadecanediamine, 1-17-heptadecanediamine, 1-18-octadecanediamine, meta-xylylenediamine and para-xylylenediamine, or mixtures thereof.

The polyamide-imides may also be formed on the basis of further amino acids/lactams different from the amino acids/lactams (B). However, the proportion of such further amino acids/lactams different from the amino acids/lactams (B) is preferably substantially zero. Besides the amide-imide system CAB, specific preferred embodiments therefore contain additional amide-imide systems or amide systems, which are produced by partial replacement of the amide-imide system CAB by EAB or CD. An additional amide-imide system is formed with the addition of a further diamine, that is to say with a partial replacement of the cycloaliphatic diamine (component C) by a diamine of component E, whereas an additional amide system is produced by partial replacement of the dicarboxylic acid component AB by another dicarboxylic acid (component D). Mixed forms are also possible, in which CAB groups are present together with groups of type EAB and CD, and therefore then possibly also in combination with ED.

As polycondensation catalysts, the monomer mixtures can be mixed with 0.005 to 1.5% by weight of phosphorous

SCHEMA 4

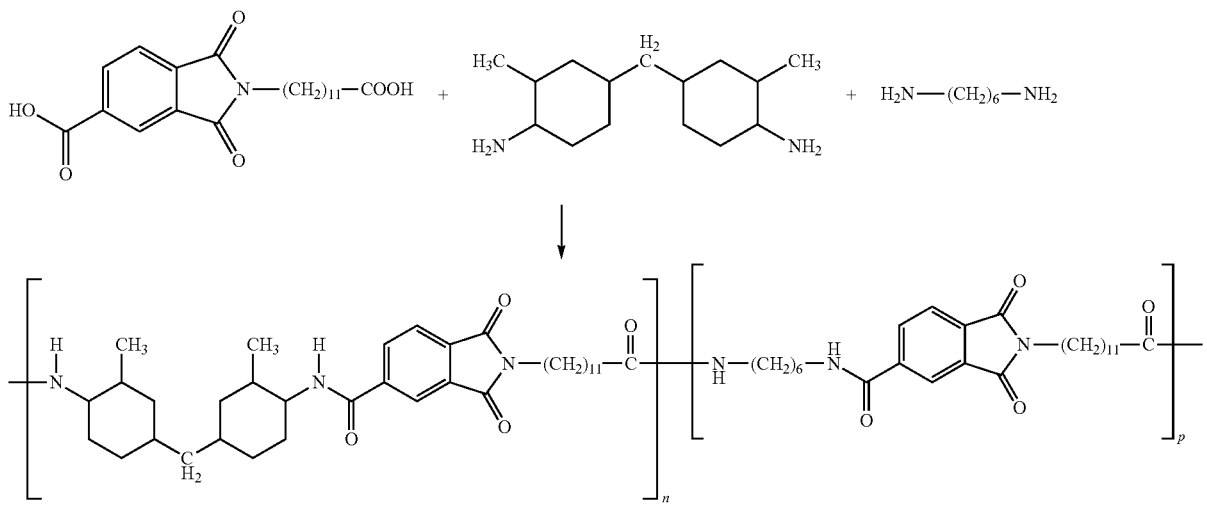

Copolyamide-imides of this type based on the dicarboxylic acid component AB, cycloaliphatic diamines (C), and also a further diamine (component E) are preferably formed in an amount of 80 to 20 mol %, in particular in an amount of 70 to 30 mol %, from the polyamide-imide unit CAB and in an compounds, such as phosphoric acid, phosphorous acid, hypophosphorous acid, phenylphosphonic acid, phenylphosphinic acid and/or salts thereof containing monovalent to trivalent cations, such as Na, K, Mg, Ga, Zn or Al and/or esters thereof such as triphenyl phosphate, triphenyl phosphite or tris-(nonylphenyl)-phosphite. Hypophosphorous acid and sodium hydrogen hydrophosphite monohydrate in an amount of 100 to 500 ppm of phosphorous based on the total monomer weight are preferred.

To control the molar mass, the relative viscosity or flowability or the MVR, regulators in the form of monocarboxylic acids or monoamines can be added to the batch. Aliphatic, cycloaliphatic or aromatic monocarboxylic acids or monoamines suitable as regulators are acetic acid, propanoic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)-propylamine, methylcyclohexylamine, dimethylcyclohexylamine, benzylamine, 2-phenylethylamine, inter alia. The regulators can be used individually or in combination. Other monofunctional compounds can also be used as regulators, which can react with an amino group or acid group, such as anhydrides, isocyanates, acid halides or esters. Phthalic acid is a special regulator, which is capable together with amino end groups of forming an amide bond. The conventional used quantity of the regulators is between 10 and 200 mmol per kg of polymer.

The refractive index of the polyamide-imides is preferably greater than or equal to 1.53, the Abbe number is greater than or equal to 25, and the density is less than or equal to 1.3 g/cm$^3$. The solution viscosity or relative viscosity $\eta_{rel}$ (in accordance with DIN EN ISO 1628-1) is preferably between 1.3 and 2.0, in particular between 1.40 and 1.9. Furthermore, the glass transition point $T_g$ of the transparent PAI is preferably above 100° C., preferably above 120° C., particularly preferably above 140° C.

The light transmission of moulded parts having a thickness of 2 mm is at least 80%, preferably at least 85% and particularly preferably at least 88%. In this case, the haze is at most 5%, preferably at most 4% and particularly preferably at most 3%. These optical values are determined at 23° C. using a Haze-Gard Plus by Byk-Gardener in accordance with ASTM D-1003 (light type C) on plates measuring 60×60×2 mm in size.

Preferred embodiments of the invention additionally also include moulding compounds based on the aforementioned transparent polyamide-imides. In the present case, a polyamide moulding compound having the following composition is specifically proposed accordingly:
(F1) 30-100% by weight of at least one previously described polyamide-imide or copolyamide-imide
(F2) 0-70% by weight of reinforcing agents and/or fillers
(F3) 0-50% by weight of additives and/or further polymers, wherein the components F1 to F3 together give 100%.

The further polymers of component (F3) can be homopolymers and/or copolymers, can be polyamides, or also other polymers, such as polyesters, polycarbonates, etc., or can be mixtures thereof. Homopolyamides and/or copolyamides are preferred.

The moulding compounds can be modified with up to 70% by weight, preferably 10-70% by weight, and particularly preferably with 20-60% by weight of fillers and reinforcing agents (component F2), wherein fillers and reinforcing agents known to a person skilled in the art can be used.

Glass fibres, carbon fibres (graphite fibres), metal fibres or plastic fibres are preferred as reinforcing agents. Reinforcement can be carried out with short fibres, such as cut glass of 2-12 mm in length, or endless fibres (roving). Glass fibres are particularly preferred, wherein the glass fibres may have a circular or non-circular cross section. In this case, glass fibres with a non-circular cross-sectional area and a ratio of the main cross-sectional axis to the secondary cross-sectional axis of more than 2, preferably from 2 to 8, in particular from 2 to 5, are preferably used. These "flat glass fibres" have an oval or elliptical cross-sectional area, an elliptical cross-sectional area provided with one or more constrictions (what are known as cocoon fibres), a polygonal or rectangular cross-sectional area, or a practically rectangular cross-sectional area.

The flat glass fibres according to the invention with a non-circular cross-sectional area are preferably used as short glass fibres (cut glass with a length from 0.2 to 20 mm, preferably 2-12 mm). A further characterising feature of the flat glass fibres used lies in the fact that the length of the main cross-sectional axis preferably lies in the range from 6 to 40 µm, in particular in the range from 15 to 30 µm, and the length of the secondary cross-sectional axis lies in the range from 3 to 20 µm, in particular in the range from 4 to 10 µm.

To reinforce the moulding compounds according to the invention, mixtures of glass fibres with circular and non-circular cross section can also be used, wherein the proportion of flat glass fibres as defined above is preferably predominant, that is to say makes up more than 50% of the total mass of fibres. The round glass fibres, which have a circular cross-sectional area, have a diameter of 6-20 µm, preferably 6-13 µm, particularly preferably of 6-10 µm. Combinations of the glass fibres (glass fibres that are circular and/or non-circular in cross section) with carbon fibres and/or synthetic fibres, such as aramid fibres, and/or basalt fibres, can also be used for reinforcement.

The glass fibres used in accordance with the invention as roving (filler component B) have a diameter from 10 to 20 µm, preferably from 12 to 18 µm, wherein the cross section of the glass fibres can be round, oval, elliptical, elliptical with one or more constrictions, polygonal, rectangular or practically rectangular. "Flat glass fibres" with a ratio of the cross-sectional axes from 2 to 5 are particularly preferred.

All previously described glass fibres can be selected in this case from the group consisting of E-glass fibres, A-glass fibres, C-glass fibres, D-glass fibres, M-glass fibres, S-glass fibres and/or R-glass fibres, wherein E-glass fibres are preferred. Furthermore, the glass fibres per se, that is to say with round, flat or polygonal fibres with a ratio of the main cross-sectional axis to the secondary cross-sectional axis of more than two, may also be provided with an aminosilane coating or an epoxysilane coating.

The polyamide-imide moulding compounds reinforced with cut fibres can be produced by known compounding methods, in which the cut fibres, in particular cut glass, are metered into the feed device together with the other components of the moulding compound. Alternatively, the cut fibres may also be introduced separately into the polymer melt by means of active conveyance in housings of an extruder, which are arranged closer to the discharge.

The polyamide-imide moulding compounds reinforced with endless fibres can be produced by the known methods for producing long-fibre-reinforced rod granulate, in particular by pultrusion methods, in which the endless fibre strand (roving) is fully saturated with the polymer melt and is then cooled and cut.

The long-fibre-reinforced rod granulate obtained in this manner, which preferably has a granulate length from 3 to 25 mm, in particular from 4 to 12 mm, can be further processed by means of the conventional processing methods (such as injection moulding, pressing) to form moulded parts, wherein particularly goof properties of the moulded part are achieved with gentle processing methods. The endless carbon fibres used with the pultrusion method have a diameter from 5 to 10

µm, preferably 6 to 8 µm. The endless carbon fibres can be used alone or in combination with endless glass fibres (circular and/or non-circular cross section).

As a further component, the thermoplastic moulding compounds may preferably contain a particulate filler or a mixture of two or more different fillers, possibly in combination with reinforcing agents. For example, particulate fillers based on talc, mica, silicate, quartz, titanium dioxide, wollastonite, kaolin, amorphous silicic acids, magnesium carbonate, magnesium hydroxide, chalk, lime, feldspar, barium sulphate, solid or hollow glass balls or ground glass, permanently magnetic or magnetisable metal compounds and/or alloys can be considered. The fillers may also be surface-treated.

In addition, the moulding compounds may contain stabilisers, processing aids and impact toughness modifiers as well as further additives in a concentration up to 50% by weight (component F3). In a further embodiment, the moulding compound according to the invention contains up to 45% by weight of one or more impact toughness modifiers (ITMs). An ITM concentration in the range between 5 and 30% by weight is preferred.

The above-mentioned optional additives (component F3) may be, inter alia, inorganic stabilisers, organic stabilisers, such as UV stabilisers, heat stabilisers, radical scavengers and/or processing aids, nucleation agents, plasticisers, lubricants, dyestuffs, metal pigments, metal flecks, metal-coated particles, halogen-containing flame retardants, halogen-free flame retardants, impact toughness modifiers, antistatic agents, conductive additives, release agents, optical brighteners, natural layer silicates, synthetic layer silicates or further polymers, or combinations or mixtures thereof. Furthermore, the moulding compounds may contain nanoscale fillers and/or functional substances, such as layer minerals or metal oxides, which increase the refractive index. For example, carbon black and/or carbon nanotubes, graphite or metal particles or metal fibres can be used as antistatic agents in the moulding compounds according to the invention. For example, kaolins, serpentines, talc, mica, vermiculites, illites, smectites, montmorillonite, hectorite, double hydroxides or mixtures thereof can be used as layer silicates in the moulding compounds according to the invention. The layer silicates can be surface-treated or may be untreated. For example, antioxidants, antiozonants, light stabilisers, UV stabilisers, UV absorbers or UV blockers can be used as stabilisers or anti-ageing agents in the moulding compounds according to the invention.

The invention further relates to a low-haze object having at least one region or a layer consisting of the polyamide-imide moulding compound according to the invention, as has been specified above. Here, the object is preferably a film, an insert part, a profile, a tube, a hollow body or an optically variable filter or particularly preferably an optical lens, particularly preferably an ophthalmic lens. Here, the light transmission within the context of the invention is at least 80%, preferably at least 85% and particularly preferably at least 88%.

Here, as already mentioned above, the value of the light transmission within the scope of this text is always to be understood to be determined in accordance with the ASTM D1003 method (light type CIE-C). Here, the light transmission was measured in the experiments detailed below using a device with the name Haze Guard Plus by BYK Gardner (DE) on plates measuring 60×60×2 mm in size. The transmission value is specified for the visible wavelength range defined in accordance with CIE-C, that is to say with basic intensities approximately between 400 and 770 nm. The plates measuring 60×60×2 mm in size are produced for example for this purpose using an Arburg injection moulding machine in a polished mould, wherein the cylinder temperature is between 200 and 340° C. and the mould temperature is between 20 and 140° C.

In particular for high-quality optical applications, for example as lenses, it has proven to be advantageous if an object formed from the polyamide-imide moulding compound has a glass transition point above 100° C., preferably above 120° C., particularly preferably above 140° C.

Lastly, the invention therefore also relates to the use of the previously described moulding compounds for the production of moulded articles. In this case, the moulded articles are preferably selected from the group consisting of custom-fit parts, parts movable with respect to one another, functional elements, operational elements, tracking elements, adjustment elements, supporting elements, frame elements, switches and casings in the field of electrical engineering, electronics, power engineering and drive technology, mechanical engineering, automotive engineering, furniture, sport, sanitation, hygiene, medial engineering, transport, telecommunications, consumer electronics, domestic appliances or electrical tools, produced by injection moulding, extrusion or other forming techniques, for example instrument panels in the cockpit area of a car, frame components of a sewing machine, mobile phone casings, casings or frame parts of laptops or notebooks. The proposed polyamide-imide moulding compound can also be used for example as a component or coating of elements with a spectral filter effect, such as spectacle lenses, lenses for sunglasses, correction lenses, optical filters and as a switching unit for optical signal processing, ski goggles, visors, protective goggles, photo recording, displays, optical data storage media, windows of buildings and vehicles, etc. On the other hand, they can also be used in conjunction with decorative elements or structural elements, such as spectacle frames, toys, and covers, in particular as mobile telephone casings, parts of electronic devices, coatings, in particular of packagings, decorative articles, sports equipment, clothing, and preferably in the automotive field.

Further embodiments are specified in the dependent claims.

DESCRIPTION OF PREFERRED EMBODIMENTS

Specific examples (B) will be specified hereinafter and compared with comparative examples (VB) and discussed. The examples are intended to support the practicability of the invention and to demonstrate the inventive step, but are not to be interpreted as limiting for the general invention formulated in the claims.

The measurements were taken in accordance with the following standards and on the following test specimens.

The tensile modulus of elasticity was determined in accordance with ISO 527 with a strain rate of 1 mm/min, the yield stress, the tear strength and the elongation at tear were determined in accordance with ISO 527 with a strain rate of 50 mm/min (unreinforced variant) or a strain rate of 5 mm/min (reinforced variant) at a temperature of 23° C., wherein an ISO tension bar was used as a test specimen, standard: ISO/CD 3167, A1 type, 170×20/10×4 mm.

Impact toughness and notch toughness were measured by Charpy in accordance with ISO 179 on an ISO test bar, standard: ISO/CD 3167, B1 type, 80×10×4 mm at 23° C.

The thermal behaviour (glass transition temperature (Tg)) was determined on the basis of ISO standard 11357-11-2 on the granulate. Differential scanning calorimetry (DSC) was carried out with a heating rate of 20° C./min. The temperature for the mid-stage or the turning point is specified for the glass transition temperature (Tg).

The relative viscosity (was measured in accordance with DIN EN ISO 307 on the basis of 0.5% by weight of m-cresol solutions at 20° C. Granulate was used as a specimen. The heat deflection temperature HDT A (1.8 MPa) was determined in accordance with ISO 75 on ISO impact bars measuring 80×10×4 mm in size.

The haze and transmission were determined at 23° C. using a Haze-Gard Plus by Byk-Gardener in accordance with ASTM D-1003 (light type C) on plates measuring 60×60×2 mm in size.

The refractive index and the Abbe number were determined on coloured plates measuring 50×30×3 mm in size using an Abbe refractometer by Zeiss in daylight. The refractive indices are to be understood as $n_D^{20}$ values. The Abbe number was determined with the aid of a nomogram in order to determine the average dispersion and the values determined using the Abbe refractometer for K and the refractive index $n_D^{20}$.

The water absorption was determined on tension bars after 96 hours of storage at 95° C. in water.

The gloss measurement (gloss 60°) was taken in accordance with ISO 2813 using a Multi Gloss 268 glossmeter by Minolta at an angle of 60°.

The stress crack resistance was determined in accordance with DIN 53449, part 3 "bent strip method" on an ISO tension bar, standard: ISO/CD 3167, A1 type, 170×20/10×4 mm at 23° C. The outer fibre elongation (%) at which, after immersion for 60 seconds in the medium, cracks are visible with the naked eye is converted into a stress, which is specified in the table, by multiplication with the tensile modulus of elasticity (dry, MPa) of the material to be measured.

Examples B1 to B7

Lactam or amino carboxylic acid and trimellitic acid anhydride as well as stabilisers and water were introduced into a 20l autoclave and heated to a product temperature of 290° C. (260° C. in the case of amino carboxylic acids). After 3.5 hours with stirring, the pressure phase was terminated by reducing the pressure of the autoclave to normal pressure. The product temperature was then lowered to 260° C. and the melt was stirred under nitrogen atmosphere for 1.5 hours. The diamines and, where applicable, further dicarboxylic acids were then added. The mixture was stirred under nitrogen until the predefined torque was reached. The polymer melt was then discharged via a nozzle cooled in the water bath and granulated. The polycondensate was dried for 24 hours at 80° C. and under a vacuum of 30 mbar.

Examples B8 to B10 and VB3 and VB4

The previously produced polyamide-imide from examples B1 and B2 and also Grilamid TR90 were compounded with the components specified in Table 3 in a twin-screw extruder by Werner and Pfleiderer having a screw diameter of 25 mm under predefined process parameters (cylinder temperature: 100-280° C.; screw rotational speed: 200 rpm; throughput: 10 kg/h). The product was removed in the form of a strand from a die having a diameter of 3 mm and was granulated after water cooling. The granulate was dried over 24 hours at 80° C. under a vacuum of 30 mbar.

Processing:

The polyamide-imides from B1 to B7, the polyamides in VB1 and VB2 and also the compounds from B8 to B10 and VB3 and VB4 were injection moulded using an Arburg Allrounder 320-210-750 injection moulding machine at cylinder temperatures from 240 to 280° C. (zones 1 to 4) and at a mould temperature of 80° C. to form test specimens.

TABLE 1

Composition and properties of examples B1 to B5

|  | Unit | B1 | B2 | B3 | B4 | B5 |
| --- | --- | --- | --- | --- | --- | --- |
| molar ratio A:B:C | — | 1:1:1 | 1:1:1 | 1:2:1 | 1:1:1 | 1:2:1 |
| TMA | % by weight | 31.71 | 31.50 | 23.86 | 30.41 | 23.06 |
| laurolactam | % by weight | 32.57 |  |  |  |  |
| aminododecanoic acid | % by weight |  |  |  |  |  |
| aminoundecanoic acid | % by weight |  | 33.01 | 50.01 | 31.86 | 48.32 |
| stearyl amine | % by weight | 1.00 | 1.00 |  |  |  |
| PACM | % by weight | 34.72 | 34.49 | 26.13 |  |  |
| MACM | % by weight |  |  |  | 37.73 | 28.62 |
| properties |  |  |  |  |  |  |
| solution viscosity ($\eta_{rel}$) | — | 1.58 | 1.57 | 1.63 | 1.53 | 1.74 |
| tensile modulus of elasticity | MPa | 1950 | 2050 | 1770 | 2030 | 1840 |
| yield stress | MPa | 68 | 71 | 59 | 77 | 64 |
| tear strength | MPa | 47 | 57 | 45 | 62 | 46 |
| elongation at tear | % | 70 | 80 | 110 | 80 | 100 |
| impact toughness 23° C. | kJ/m² | n.b. | n.b. | n.b. | n.b. | n.b. |
| impact toughness −30° C. | kJ/m² | n.b. | n.b. | n.b. | n.b. | n.b. |
| notch toughness 23° C. | kJ/m² | 13 | 12 | 12 | 11 | 11 |
| notch toughness −30° C. | kJ/m² | 13 | 10 | 13 | 10 | 10 |
| glass transition temperature | ° C. | 140 | 145 | 105 | 159 | 120 |
| water absorption | % | 2.4 | 2.6 | 2.7 | 2.3 | 2.7 |
| transmission | % | 88 | 90 | 90 | 90 | 90 |
| haze | % | 3.2 | 1.4 | 2.5 | 1.5 | 3.1 |
| gloss 60° |  | 143 | 146 | 136 | 145 | 120 |

TABLE 1-continued

Composition and properties of examples B1 to B5

|  | Unit | B1 | B2 | B3 | B4 | B5 |
|---|---|---|---|---|---|---|
| Abbe number |  | 34 | 33 | 30 | 35 | 40 |
| refractive index |  | 1.5491 | 1.5551 | 1.5387 | 1.5523 | 1.5363 |
| stress crack resistance |  |  |  |  |  |  |
| methanol | MPa | 58 | 59 | n.d. | 60 | n.d. |
| ethanol | MPa | 79 | 80 | n.d. | 80 | n.d. | n.d.: not determined
n.b.: no break

TABLE 2

Composition and properties of examples B6 and B7 and of comparative examples VB1 and VB2

|  | Unit | B6 | B7 | VB1 | VB2 |
|---|---|---|---|---|---|
| molar ratio A:B:C | — | A:B:D:C = 0.7:0.7:0.3:1 | A:B:C = 1:1:1 |  |  |
| TMA | % by weight | 23.98 | 29.29 | Grilamid TR90 | Grilamid TR55 |
| laurolactam | % by weight | 24.63 | 30.08 |  |  |
| aminododecanoic acid | % by weight |  |  |  |  |
| aminoundecanoic acid | % by weight |  |  |  |  |
| isophthalic acid | % by weight | 8.89 |  |  |  |
| TMDC | % by weight |  | 40.63 |  |  |
| MACM | % by weight | 42.51 |  |  |  |
| properties |  |  |  |  |  |
| solution viscosity ($\eta_{rel}$) | — | 1.53 | 1.50 | 1.78 | 1.75 |
| tensile modulus of elasticity | MPa | 2250 | 2130 | 1600 | 2200 |
| yield stress | MPa | 72 | 58 | 60 | 75 |
| tear strength | MPa | 70 | 55 | 45 | 50 |
| elongation at tear | % | >50 | >50 | >50 | >50 |
| impact toughness 23° C. | kJ/m² | n.b. | n.b. | n.b. | n.b. |
| impact toughness −30° C. | kJ/m² | n.b. | n.b. | n.b. | n.b. |
| notch toughness 23° C. | kJ/m² | 11 | 12 | 13 | 8 |
| notch toughness −30° C. | kJ/m² | 10 | 10 | 12 | 7 |
| glass transition temperature | ° C. | 173 | 166 | 155 | 160 |
| heat deflection temperature HDT/A | ° C. | 140 | 135 | 115 | 130 |
| water absorption | % | 2.6 | 2.4 | 2.6 | 2.2 |
| transmission | % | 90 | 90 | 93 | 90 |
| haze | % | 2.2 | 1.8 | 1 | 1 |
| stress crack resistance |  |  |  |  |  |
| methanol | MPa | n.d. | 60 | 60 | 0 |
| ethanol | MPa | n.d. | 85 | 60 | 0 | n.d.: not determined
n.b.: no break

TABLE 3

Composition and properties of examples B8 to B10 and of comparative examples VB3 and VB4

|  | Unit | B8 | VB3 | B9 | B10 | VB4 |
|---|---|---|---|---|---|---|
| PAI B1 | % by weight |  |  | 30.5 |  |  |
| PAI B2 | % by weight | 79.65 |  |  | 30.5 |  |
| Grilamid TR90 | % by weight |  | 79.65 |  |  | 30.5 |
| glass fibre 10 μm | % by weight | 20.0 | 20.0 |  |  |  |

TABLE 3-continued

Composition and properties of examples B8 to B10 and of comparative examples VB3 and VB4

|   | Unit | B8 | VB3 | B9 | B10 | VB4 |
|---|---|---|---|---|---|---|
| glass fibre 6 μm | % by weight |  |  | 53.0 | 53.0 | 53.0 |
| Grilamid L20 | % by weight |  |  | 12.5 | 12.5 | 12.5 |
| Irganox 1098 | % by weight | 0.25 | 0.25 | 0.25 | 0.25 | 0.25 |
| Hostanox PAR24 | % by weight | 0.1 | 0.1 | 0.1 | 0.1 | 0.1 |
| white pigment | % by weight |  |  | 3.65 | 3.65 | 3.65 |
| properties |  |  |  |  |  |  |
| tensile modulus of elasticity | MPa | 5900 | 5100 | 16100 | 16000 | 14300 |
| yield stress | MPa | 119 | 106 | 179 | 183 | 169 |
| tear strength | MPa | 118 | 106 | 179 | 183 | 169 |
| elongation at tear | % | 4.1 | 4.0 | 2.2 | 2.2 | 2.5 |
| impact toughness 23° C. | kJ/m$^2$ | 48 | 52 | 49 | 54 | 62 |
| impact toughness −30° C. | kJ/m$^2$ | 40 | 45 | 42 | 36 | 54 |
| notch toughness 23° C. | kJ/m$^2$ | 11 | 12 | 12 | 12 | 14 |
| notch toughness −30° C. | kJ/m$^2$ | 10 | 10 | 10 | 10 | 11 |
| glass transition temperature | ° C. | 145 | 155 | 140 | 145 | 155 |
| heat deflection temperature HDT/A | ° C. | 110 | 95 | 115 | 120 | 104 |
| transmission | % | 77 | 70 | n.d. | n.d. | n.d. | n.d.: not determined
n.b.: no break
Grilamid TR90: transparent polyamide PA MACM12 (EMS-CHEMIE)
Grilamid TR55: transparent polyamide PA MACMI/12 (EMS-CHEMIE)
Grilamid L20 polyamide PA 12 of average viscosity (EMS-CHEMIE)
glass fibre 10 μm Vetrotex 995 EC10-4.5, glass fibre with a round cross section of 10 μm diameter and an average length of 4.5 mm (Vetrotex).
glass fibre 6 μm OC Micromax 771-6, glass fibre with a round cross section of 6 μm diameter and an average length of 3 mm (Owens Corning).
white pigment zinc sulphide Sachtolith HDS (Sachtleben)
Irganox 1098 phenolic antioxidant (BASF)
Hostanox PAR24 phosphite-containing antioxidant (Clariant)

The polyamide-imides B1 to B5 according to the invention have a greater rigidity with comparable toughness (impact toughness, notch toughness, elongation at tear) compared to transparent polyamides such as VB1, in spite of a lower glass transition temperature.

When comparing the polyamide-imides B6 and B7 with a similarly rigid transparent polyamide VB2, it is noticeable that the polyamide-imides according to the invention have a higher notch toughness and a much improved stress crack resistance.

In the case of the moulding compounds reinforced with glass fibres, such as B8, B9 and B10, it has been found that the proposed polyamide-imide-based moulding compounds have a greater rigidity, a greater strength and a greater heat deflection temperature HDT/A compared to the moulding compounds based on the transparent polyamides VB3 and VB4, in spite of a lower glass transition temperature. Here, the high toughness of the transparent polyamides is achieved at the same time.

The unreinforced polyamide-imides B1 to B7 have a transmission measured on plates 2 mm thick of up to 90% and are therefore completely at the level of the transparent polyamides VB1 and VB2. The haze values of the polyamide-imides produced using laboratory systems are slightly above the level of the transparent polyamides produced on an industrial scale. Further optimisation of the production process allows the proposed polyamide-imides to achieve haze values similar to the transparent polyamides.

In particular with the moulding compounds reinforced only to a small extent, a greater transmission (comparison of B8 and VB3) is produced due to the smaller differences between the refractive indices of the matrix and glass fibres for the moulding compounds based on polyamide-imide.

The invention claimed is:
1. A thermoplastic moulding compound comprising:
(F1) 30-100% by weight of at least one polyamide-imide based on one or more different imido-dicarboxylic acids (AB) or derivatives thereof, and cycloaliphatic diamines (C) selected from the group consisting of bis-(4-amino-3-methyl-cyclohexyl)-methane (MACM), bis-(4-amino-3-ethyl-cyclohexyl)-methane (EACM), bis-(4-amino-3,5-dimethy-cyclohexyl)-methane (TMDC), and a mixture thereof, wherein the imido-dicarboxylic acids (AB) or derivatives thereof are selected from the group of imido-dicarboxylic acids (AB) having the following structural formulas:

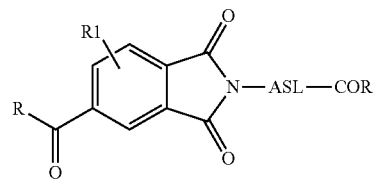

-continued

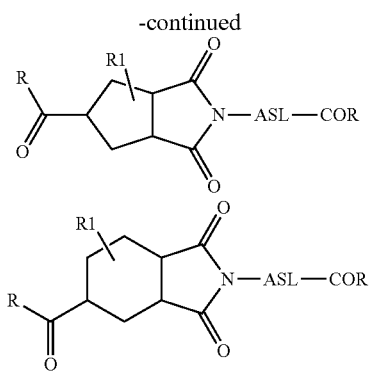

wherein:
ASL=(CH$_2$)$_{11}$,
R=OH, O-alkyl, O-aryl, Cl, NH-ASL-COOH, Br, O—(CO)-alkyl, O—(CO)-aryl,
R1=H, methyl, ethyl, propyl, with the provision that the ring can be substituted once or twice and, with double substitution of the ring, the two substituents can be selected from the group, but may be different;
with the proviso that the polyamide-imide is free from building blocks in which said cycloaliphatic diamines (C) are, with at least one amino-group thereof, forming the imido-element of imido-aminocarboxylic acids corresponding to said imido-dicarboxylic acids (AB) and in which said cycloaliphatic diamines (C) are replacing the structural element N-ASL-COR therein,
and with the proviso that the polyamide-imide is free from aromatic diamines;
(F2) 0-70% by weight of reinforcing agents and/or fillers; and
(F3) 0-50% by weight of additives and/or further polymers that are different from the polyamide-imide,
wherein the components (F1), (F2) and (F3) together yield 100% by weight of the composition of the thermoplastic moulding compound.

2. The thermoplastic moulding compound according to claim 1, wherein the polyamide-imide is based exclusively on
a diacid part, exclusively based on
20-100 mol-% of one or more of said imido-dicarboxylic acids (AB) or derivatives thereof,
0-80 mol-% of at least one further diacid (D), different from said imido-dicarboxylic acids (AB),
wherein the diacid parts supplement to 100 mol %;
and a diamine part, exclusively based on
20-100 mol % of at least one of said cycloaliphatic diamines (C) selected from the group consisting of bis-(4-amino-3-methyl-cyclohexyl)-methane (MACM), bis-(4-amino-3-ethyl-cyclohexyl)-methane (EACM), bis-(4-amino-3,5-dimethy-cyclohexyl)-methane (TMDC), and a mixture thereof,
0-80 mol % of at least one further, non-aromatic diamine (E), different from said cycloaliphatic diamines (C)
wherein the diamine parts supplement to 100 mol %.

3. The thermoplastic moulding compound according to claim 1, wherein it is exclusively based on one or more of said imido-dicarboxylic acids (AB) or derivatives thereof, and said cycloaliphatic diamines (C) selected from the group consisting of bis-(4-amino-3-methyl-cyclohexyl)-methane (MACM), bis-(4-amino-3-ethyl-cyclohexyl)-methane (EACM), bis-(4-amino-3,5-dimethy-cyclohexyl)-methane (TMDC), and a mixture thereof.

4. The thermoplastic moulding compound according to claim 1, wherein at least one imido-dicarboxylic acid (AB) or derivative thereof, in the polyamide-imide corresponds to the following structural formula:

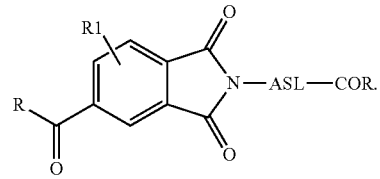

5. The thermoplastic moulding compound according to claim 1, wherein a cycloaliphatic or aromatic tricarboxylic acid (A) or derivatives thereof, forming the imido-dicarboxylic acid (AB) or derivative thereof at least in part, is selected from the group consisting of: cyclopentane-1,2,4-tricarboxylic acid, 2-methyl-cyclopentane-1,2,4-tricarboxylic acid, 3-methyl-cyclopentane-1,2,4-tricarboxylic acid, 3,5-dimethyl-cyclopentane-1,2,4-tricarboxylic acid, cyclohexane-1,2,4-tricarboxylic acid, 2-methyl-cyclohexane-1,2,4-tricarboxylic acid, 3-methyl-cyclohexane-1,2,4-tricarboxylic acid, 4-methyl-cyclohexane-1,2,4-tricarboxylic acid, 5-methyl-cyclohexane-1,2,4-tricarboxylic acid, 1,2-dimethyl-cyclohexane-1,2,4-tricarboxylic acid, 3,5-dimethyl-cyclohexane-1,2,4-tricarboxylic acid, 2,4-dimethyl-cyclohexane-1,2,4-tricarboxylic acid, and a mixture thereof.

6. The thermoplastic moulding compound according to claim 1, wherein the molar ratio in the overall polyamide-imide of a cycloaliphatic or aromatic tricarboxylic acid (A) or derivatives thereof, or, with a mixture of different cycloaliphatic or aromatic tricarboxylic acids (A) or derivatives thereof, the sum of these tricarboxylic acids, forming the imido-dicarboxylic acid (AB) or derivative thereof at least in part, to an aminocarboxylic acid or lactam (B), or, with a mixture of different such aminocarboxylic acids or lactams (B), the sum of these systems, forming the imido-dicarboxylic acid (AB) or derivative thereof at least in part, lies in the range from 1:2.5 to 1:1.

7. The thermoplastic moulding compound according to claim 1, wherein the molar ratio in the polyamide-imide of at least one imido-dicarboxylic acid (AB) or derivative thereof, or, with a mixture of different imido-dicarboxylic acids (AB) or derivatives thereof, the sum of these dicarboxylic acids, to the cycloaliphatic diamine (C), or, with a mixture of different cycloaliphatic diamines (C), to the sum of these diamines, lies in the range from 1.5:1 to 1:1.5
and/or wherein the polyamide-imide is formed on the basis of at least one further diacid (D), different from the component (AB), wherein, in the overall polyamide-imide, the diacid proportion formed from the component (AB) makes up at least 20 mol %, and the rest making 100 mol % is formed by the component (D).

8. The thermoplastic moulding compound according to claim 1, wherein the polyamide-imide is formed on the basis of at least one further diamine (E), different from the component (C), wherein, in the overall polyamide-imide, the diamine proportion formed from the component (C) makes up at least 20 mol % and the rest making up 100 mol % is formed by the component (E).

9. The thermoplastic moulding compound according to claim 1, wherein the imido-dicarboxylic acid (AB) is selected from the group consisting of: trimellitic imido-undecanoic acid, trimellitic imido-lauric acid, and a mixture thereof, and in that the cycloaliphatic diamine (C) is bis-(4-amino-3-methyl-cyclohexyl)-methane (MACM).

10. The thermoplastic moulding compound according to claim 1, wherein the polyamide-imide is formed on the basis of at least one further diacid (D), different from the component (AB), and this further dicarboxylic acid (D) is terephthalic acid, isophthalic acid, adipic acid, or cyclohexane-1,3-dicarboxylic acid, or a mixture thereof.

11. The thermoplastic moulding compound according to claim 1, wherein, as component (F2), fibrous and/or particulate reinforcing agents and/or fillers are added.

12. The thermoplastic moulding compound according to claim 1, wherein, as component (F3), stabilisers, nucleation agents, processing aids and/or impact toughness modifiers are contained.

13. An object having at least one region or a layer formed from the thermoplastic moulding compound according to claim 1, wherein said object is a film, an insert part, a profile, a tube, a hollow body, an optically variable filter, an optical lens.

14. A method for producing a polyamide-imide for a thermoplastic moulding compound according to claim 1, wherein, in a first reaction step, an imido-dicarboxylic acid (AB) selected from the group of imido-dicarboxylic acids (AB) having the following structural formulas:

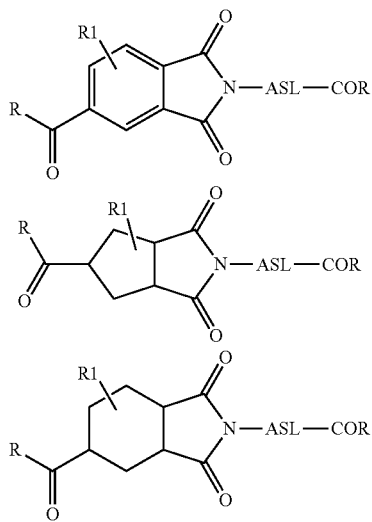

when
ASL=(CH$_2$)$_{11}$,
R=OH, O-alkyl, O-aryl, Cl, NH-ASL-COOH, Br, O—(CO)-alkyl, O—(CO)-aryl,
R1=H, methyl, ethyl, propyl, with the provision that the ring can be substituted once or twice, and, with double substitution of the ring, the two substituents can be selected from the group, but may be different
is formed starting from the corresponding cycloaliphatic or aromatic tricarboxylic acids having at least two vicinal carboxyl groups (A) or derivatives thereof and amino carboxylic acid or lactam (B), and, in a second subsequent and separate step, these imido-dicarboxylic acids (AB) or derivatives thereof are reacted with cycloaliphatic diamines (C) selected from the group consisting of bis-(4-amino-3-methyl-cyclohexyl)-methane (MACM), bis-(4-amino-3-ethyl-cyclohexyl)-methane (EACM), bis-(4-amino-3,5-dimethy-cyclohexyl)-methane (TMDC), and a mixture thereof, and optionally further diacids (D), different from the component (AB), and/or further diamines (E), different from the component (C), to form the polyamide-imide.

15. The thermoplastic moulding compound according to claim 1, wherein the entire proportion of imido-dicarboxylic acid (AB) or derivative thereof, in the polyamide-imide corresponds to the following structural formula:

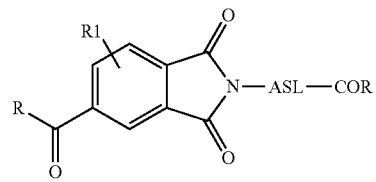

wherein, R1=H and/or ASL=(CH$_2$)$_{11}$ and/or R=OH, NH-ASL-COOH.

16. The thermoplastic moulding compound according to claim 1, wherein the imido-dicarboxylic acid (AB) or derivative thereof is selected from the group consisting of: trimellitic imido-undecanoic acid, trimellitic imido-dodecanoic acid, or derivatives thereof where R=O-alkyl, O-aryl, Cl, Br, NH-ASL-COOH, O—(CO)-alkyl, O—(CO)-aryl, or a mixture thereof.

17. The thermoplastic moulding compound according to claim 1, wherein a cycloaliphatic or aromatic tricarboxylic acid (A) or derivatives thereof in the form of acid chlorides, esters or anhydrides, forming the imido-dicarboxylic acid (AB) or derivative thereof at least in part, is selected from the group consisting of: cyclopentane-1,2,4-tricarboxylic acid, 2-methyl-cyclopentane-1,2,4-tricarboxylic acid, 3-methyl-cyclopentane-1,2,4-tricarboxylic acid, 3,5-dimethyl-cyclopentane-1,2,4-tricarboxylic acid, cyclohexane-1,2,4-tricarboxylic acid, 2-methyl-cyclohexane-1,2,4-tricarboxylic acid, 3-methyl-cyclohexane-1,2,4-tricarboxylic acid, 4-methyl-cyclohexane-1,2,4-tricarboxylic acid, 5-methyl-cyclohexane-1,2,4-tricarboxylic acid, 1,2-dimethyl-cyclohexane-1,2,4-tricarboxylic acid, 3,5-dimethyl-cyclohexane-1,2,4-tricarboxylic acid, 2,4-dimethyl-cyclohexane-1,2,4-tricarboxylic acid, or a mixture thereof.

18. The thermoplastic moulding compound according to claim 1, wherein the molar ratio in the overall polyamide-imide of a cycloaliphatic or aromatic tricarboxylic acid (A) or derivatives thereof, or, with a mixture of different cycloaliphatic or aromatic tricarboxylic acids (A) or derivatives thereof, the sum of these tricarboxylic acids, forming the imido-dicarboxylic acid (AB) or derivative thereof at least in part, to an aminocarboxylic acid or lactam (B), formed as an aliphatic aminocarboxylic acid or aliphatic lactam (B) comprising 10-12 carbon atoms, or, with a mixture of different such aminocarboxylic acids or lactams (B), the sum of these systems, forming the imido-dicarboxylic acid (AB) or derivative thereof at least in part, lies in the range from 1:1.5 to 1:1.

19. The thermoplastic moulding compound according to claim 1, wherein the cycloaliphatic diamine (C) is bis-(4-amino-3-methyl-cyclohexyl)methane (MACM).

20. The thermoplastic moulding compound according to claim 1, wherein the polyamide-imide is formed on the basis of at least one further diacid (D), different from the component (AB), wherein, in the overall polyamide-imide, the diacid proportion formed from the component (AB) lies in the range from 30 to 70 mol %, and the rest making 100 mol % is formed by the component (D), wherein the component (D) is selected from the following group: bifunctional, aliphatic, cycloaliphatic or aromatic dicarboxylic acids, selected from the group: adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, isophthalic acid, terephthalic acid, naphthalene dicarboxylic acid, cis- and/or trans-cyclohexane-1,4-dicarboxylic acid and/or cis- and/or trans-cyolohexane-1,3-dicarboxylic acid (CHDA), and mixtures thereof.

21. The thermoplastic moulding compound according to claim 1, wherein the polyamide-imide is formed on the basis of at least one further diamine (E), different from the component (C), wherein, in the overall polyamide-imide, the diamine proportion formed from the component (C) makes up 30 to 70 mol %, and the rest making up 100 mol % is formed by the component (E), wherein the component (E) is selected from the following group: linear or branched aliphatic diamine, from the following group: 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, 1-15-pentadecanediamine, 1,16-hexadecanediamine, 1-17-heptadecanediamine, 1-18-octadecanediamine, meta-xylylenediamine and para-xylylenediamine, or mixtures thereof.

22. The thermoplastic moulding compound according to claim 1, wherein the imido-dicarboxylic acid (AB) is selected from the group consisting of: trimellitic imido-undecanoic acid, trimellitic imido-lauric acid, and a mixture thereof, and in that the cycloaliphatic diamine (C) is bis-(4-amino-3-methyl-cyclohexyl)-methane (MACM), wherein the molar ratio in the polyamide-imide of imido-dicarboxylic acid (AB) to the cycloaliphatic diamine (C) lies substantially at 1:1.

23. The thermoplastic moulding compound according to claim 1, comprising:
(F1) 30-100% by weight of the at least one polyamide-imide according to claim 1;
(F2) 20-60% by weight of the reinforcing agents and/or fillers; and
(F3) 0-50% by weight of the additives and/or further polymers that are different from the polyamide-imide,
wherein the components (F1), (F2) and (F3) together yield 100% by weight of the composition of the thermoplastic moulding compound.

24. The thermoplastic moulding compound according to claim 1, wherein, as component (F2), fibrous and/or particulate reinforcing agents and/or fillers are added, and the fibrous and/or particulate reinforcing agents are selected from the group comprising glass fibres, carbon fibres, metal or plastic fibres, wherein these may have a round or flat cross section, fillers based on talc, mica, silicate, quartz, titanium dioxide, wollastonite, kaolin, amorphous silicic acids, magnesium carbonate, magnesium hydroxide, chalk, lime, feldspar, barium sulphate, solid or hollow glass balls or ground glass, permanently magnetic or magnetisable metal compounds and/or alloys, wherein the fillers surface-treated or surface untreated.

25. The thermoplastic moulding compound according to claim 1, wherein, as component (F3), stabilisers, nucleation agents, processing aids and/or impact toughness modifiers are contained, wherein in the range between 5 and 30% by weight of one or more impact toughness modifiers are contained.

26. An object having at least one region or a layer formed from the thermoplastic moulding compound according to claim 1, wherein said object is a film, an insert part, a profile, a tube, a hollow body, an optically variable filter, an ophthalmic lens, and wherein the light transmission is at least 88%.

27. A method for producing a polyamide-imide for a thermoplastic moulding compound according to claim 1, wherein, in a first reaction step, an imido-dicarboxylic acid (AB) selected from the group of imido-dicarboxylic acids (AB) having the following structural formulas:

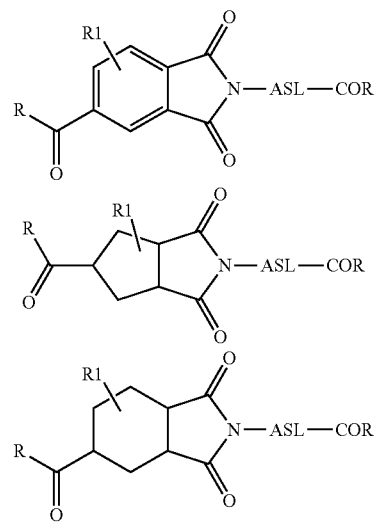

wherein:
ASL=$(CH_2)_{11}$,
R=OH, O-alkyl, O-aryl, Cl, NH-ASL-COOH, Br, O—(CO)-alkyl, O—(CO)-aryl,
R1=H, methyl, ethyl, propyl, with the provision that the ring can be substituted once or twice, and, with double substitution of the ring, the two substituents can be selected from the group, but may be different
is formed starting from the corresponding cycloaliphatic or aromatic tricarboxylic acids having at least two vicinal carboxyl groups (A) or derivatives thereof and amino carboxylic acid or lactam (B), and, in a second subsequent and separate step, these imido-dicarboxylic acids (AB) or derivatives thereof are reacted with cycloaliphatic diamines (C) selected from the group consisting of bis-(4-amino-3-methyl-cyclohexyl)-methane (MACM), bis-(4-amino-3-ethyl-cyclohexyl)-methane (EACM), bis-(4-amino-3,5-dimethy-cyclohexyl)-methane (TMDC), and a mixture thereof, and optionally further diacids (D), different from the component (AB), and/or further, non-aromatic diamines (E), different from the component (C), to form the polyamide-imide.

28. A thermoplastic moulding compound comprising:
(F1) 30-100% by weight of at least one polyamide-imide based on one or more different imido-dicarboxylic acids (AB) or derivatives thereof, and cycloaliphatic diamines (C) selected from the group consisting of bis-(4-amino-3-methyl-cyclohexyl)-methane (MACM), bis-(4-amino-3-ethyl-cyclohexyl)-methane (EACM), bis-(4-amino-3,5-dimethy-cyclohexyl)-methane (TMDC), and a mixture thereof, wherein the imido-dicarboxylic acids (AB) or derivatives thereof are selected from the group of imido-dicarboxylic acids (AB) having the following structural formulas:

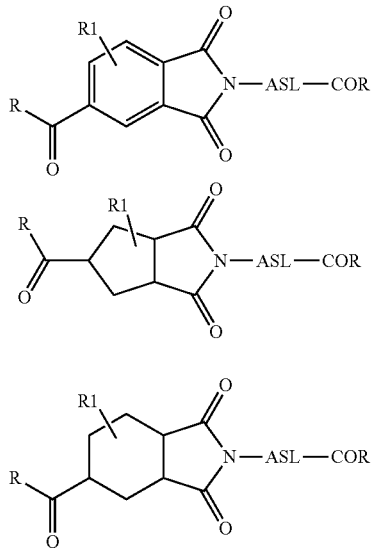

wherein:
ASL=$(CH_2)_{9-11}$,
R=OH, O-alkyl, O-aryl, Cl, NH-ASL-COOH, Br, O—(CO)-alkyl, O—(CO)-aryl,
R1=H, methyl, ethyl, propyl, with the provision that the ring can be substituted once or twice, and, with double substitution of the ring, the two substituents can be selected from the group, but may be different;
with the proviso that the polyamide-imide is free from building blocks in which said cycloaliphatic diamines (C) are, with at least one amino-group thereof, forming the imido-element of imido-aminocarboxylic acids corresponding to said imido-dicarboxylic acids (AB) and in which said cycloaliphatic diamines (C) are replacing the structural element N-ASL-COR therein,
and with the proviso that the polyamide-imide is free from aromatic diamines;
(F2) 0-70% by weight of reinforcing agents and/or fillers; and
(F3) 0-50% by weight of additives and/or further polymers that are different from the polyamide-imide,
wherein the components (F1), (F2) and (F3) together yield 100% by weight of the composition of the thermoplastic moulding compound.

* * * * *